Feb. 6, 1951     A. B. ECHOLS, JR     2,540,192
EFFICIENCY INDICATOR
Filed March 18, 1947

INVENTOR.
Angus B. Echols, Jr.,
BY
Attorney

Patented Feb. 6, 1951

2,540,192

UNITED STATES PATENT OFFICE 2,540,192

EFFICIENCY INDICATOR

Angus B. Echols, Jr., Greenville, Del.

Application March 18, 1947, Serial No. 735,357

2 Claims. (Cl. 73—112)

This invention relates to indicators, and more particularly to apparatus for indicating the proper relative adjustment of fuel and air supplied to a boiler furnace for combustion.

In the operation of a furnace for steam generation, there is a predetermined relationship between the proper amount of fuel and the air required for combustion for obtaining the optimum combustion at different firing rates.

In accordance with the present invention, an indicator is provided for purposes of indicating the control of the combustion so that the proper relationship may be maintained by the operator between the fuel and the air supplied to the boiler for combustion of the fuel.

In accordance with the present invention, separate visual indications are provided of the furnace draft and of draft required as a function of the quantity of fuel being supplied, the respective indications being brought together so that the operator may effect the proper regulation for obtaining combustion under the most desirable conditions.

In accordance with the present invention also, related indications of the actual draft in the furnace and the required draft for a particular rate of fuel feed for most effective combustion are brought together to indicate the adjustment required in either the fuel or air supply so that the operator may obtain the most effective combustion at a particular firing rate.

In accordance with the present invention also, provision is made for transforming a measurement of the quantity of fuel supplied to a boiler to a linear scale indication of the draft for such quantity.

In accordance with the present invention also, an indication of the most effective draft for the fuel being supplied and of the actual draft are brought together at a common indicating scale for ascertaining the prevailing conditions of combustion in the furnace of a boiler.

Other advantageous features of the invention will be apparent from the specification and claims.

The nature and characteristic features of the invention will be more readily understood from the following description, taken in connection with the accompanying drawings forming part hereof, in which.

It should, of course, be understood that the description and drawings herein are illustrative merely, and that various modifications and changes may be made in the structure disclosed without departing from the spirit of the invention.

Figure 4:
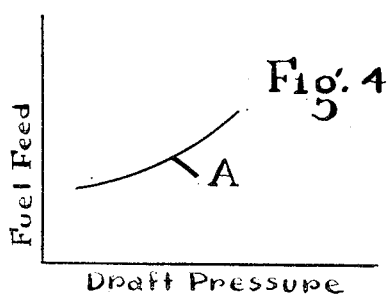
Fig. 4 is a typical curve for a boiler indicating the relationship between the fuel and the air supplied to the boiler for most effective combustion.

Referring first to Fig. 4 of the drawings, there is there illustrated graphically a curve A indicating the relationship for a particular steam boiler between the furnace draft pressures, taken as abscissas, and the rate of fuel feed, taken as ordinates, for maintaining the most effective combustion in the boiler furnace. For the most effective combustion, there should be a sufficient quantity of air supplied to the boiler furnace to effect the complete combustion of the fuel. At the same time, the air should not be supplied in such excessive quantities that some of the air supplied serves no purpose but is merely heated on its passage through the furnace and carries off heat units which should be absorbed by the heat transfer surfaces of the boiler.

Figure 1:
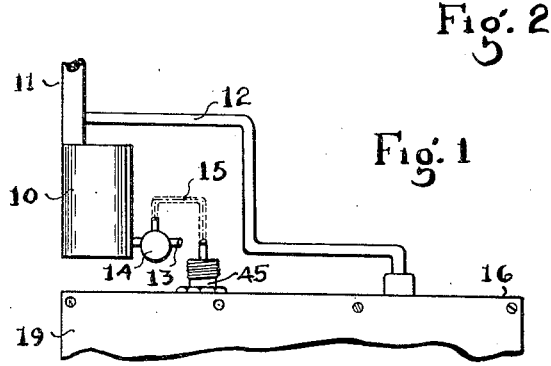
Figure 1 is a diagrammatic view illustrating the connection of the indicator to a boiler.
Figure 3:
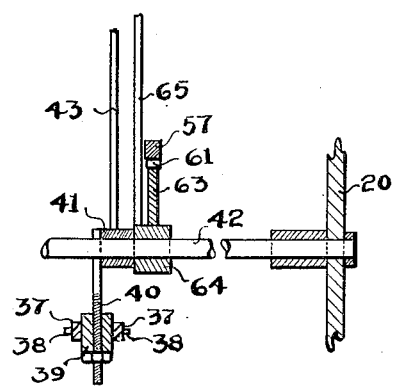
Fig. 3 is an enlarged vertical sectional view taken approximately on the line 2—2 of Fig. 1.

Referring now more particularly to Fig. 1 of the drawings, a boiler is indicated diagrammatically at 10 having a flue pipe 11 with a pressure take off pipe 12 and a fuel inlet pipe 13 provided with a rotary type flow meter 14. The rotary flow meter 14 is provided with a mechanical take off connection 15 of any preferred type, and is connected in any desired manner, such as by a flexible shaft, to the instrument which is shown diagrammatically at 16.

The instrument 16 preferably includes a casing in the form of a box having a top wall 18, a front wall 19, a rear wall 20 and side walls 21 and 22. The front wall 19 is preferably provided with a transparent window portion 23 provided with scale markings 24 for purposes to be explained.

Within the interior of the casing and preferably adjacent the side wall 22 a slack diaphragm draft gage 25 is provided. The draft gage 25 preferably includes a casing 26 having a diaphragm 27 therein and a fluid connection 28 connected through the top wall 18 is provided from one side of the diaphragm 27 to the pipe 12. The diaphragm 27 has connected thereto a diaphragm rod 29 on which an adjustable stop 30 is mounted. The zero position of the diaphragm 27 is preferably adjustable by an arm 31 carried on the side wall 22 and to which the diaphragm rod 29 is connected and an adjustable stop 32, carried in the wall 22 is provided, bearing against the arm 31.

The diaphragm casing 26 has a lug 33 thereon on which a lever 34 is mounted for engagement by the stop 30. The lower end of the lever 34 is provided with an offset portion 35 preferably at an inclination with respect to the lever 34. The offset portion 35 is provided with a plurality of openings 36 for purposes of adjustment.

A link 37 is provided, having one end inserted in one of the openings 36, and having the other end forked and pivotally connected to pins 38 on a nut 39 carried on a threaded arm 40. The threaded arm 40 is secured to a sleeve 41 mounted on a pivot shaft 42. The shaft 42 is supported by the rear wall 20 of the casing. The sleeve 41 has secured thereto an air pressure indicator preferably in the form of a segmental plate 43 swingable about the axis provided by the shaft 42.

The leading edge of the plate 43 functions in connection with the scale markings 24 on the window 23 for purposes of indication, as hereinafter explained.

The top wall 18 of the instrument casing preferably has mounted therein a suitable bearing 45 within which a shaft 46 is mounted. The shaft 46 has a speed responsive element 47 preferably of the fly ball governor type. The speed responsive element 47 preferably includes an upper collar 48, secured to the shaft 46, with downwardly extending arms 49 pivoted to the collar 48. The arms 49 have balls or weights 50 secured at their lower ends and the arms 49 are slotted, as at 44, for slidable pivotal engagement by upwardly extending arms 51. The arms 51 are pivoted at their lower ends to a lower collar 52 which is carried on the shaft 46, is rotatable with the shaft 46 and is slidable vertically therealong in accordance with the positioning of the balls or weights 50 as determined by the speed of rotation of the shaft 46.

The collar 52 carries a bearing 53 to which there is connected a vertically movable cam 54. The cam 54 is provided with a curved edge surface 55 shaped to conform to the fuel-air characteristics of the particular boiler with which the instrument is used, as heretofore pointed out with respect to Fig. 4.

The rear wall 20 of the casing has a bracket 56 secured thereto in which an arm 57, which may be square in cross section, is slidably mounted. The arm 57 has a follower roller 58 on the outer end thereof for engagement with the cam surface 55, is provided with a shoulder 59, and a spring 60 surrounding the arm 57 is provided between the shoulder 59 and the bracket 56 for normally urging the arm 57 into engagement with the cam surface 55. The arm 57 is provided with a rack 61 having teeth for engagement with the teeth 62 of a segmental gear 63 mounted on a sleeve 64 on the shaft 42. The sleeve 64 also has secured thereto, for movement therewith, a segmental indicating plate 65 having a leading edge 65a adapted to be moved with respect to the scale markings 24 on the window 23 for indicating the draft required for the particular rate of fuel feed.

In the use of the indicator in accordance with the present invention and with the shaft 46 actuated by the rotary fuel flow meter 14, the shaft 46 will be rotated and the fly balls 50 will be positioned in accordance with the speed of rotation of the shaft 46. This will in turn position the cam 54 and through the rod 57, the rack 61 and the segmental gear 63, the indicating plate 65 will be positioned with respect to the scale markings 24 on the window 23, thereby indicating the draft required for the particular rate of fuel feed. The actual draft conditions prevailing will be measured by the diaphragm 27 and translated through the diaphragm rod 29, the lever 34 and the link 37 to the sleeve 41, and will effect the positioning of the air plate 43, to give an indication of the actual draft conditions prevailing. With this information thus visually indicated at the window 23, suitable adjustment may be made either of the fuel feed or of the draft to bring the indicating plates 43 and 65 so that their leading edges are in alinement. In this condition, the boiler will then be operated with the proper relationship between the air and the fuel to provide the most effective combustion at the firing rate desired.

Figure 2:
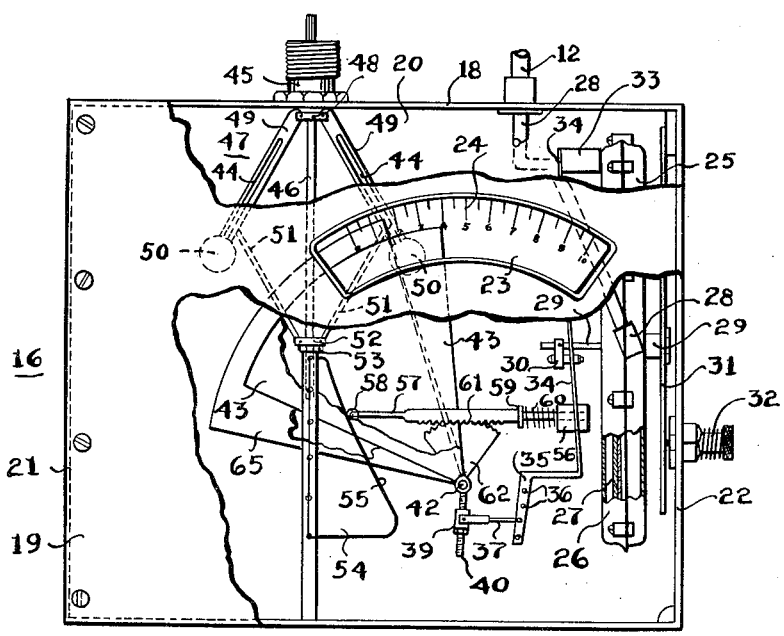
Fig. 2 is a front elevational view of indicating mechanism employed in connection with the present invention, parts being broken away to show the details of construction.

Upon reference to the positioning of the plates 43 and 65, as indicated in Fig. 2, the indicator 43 shows that there is an excess quantity of air being supplied for the amount of fuel being supplied. The operator, upon reference to the steam pressure gage (not shown) of the boiler, can ascertain whether the normal operating pressure is being maintained, and if this is the case, the firing rate should not be increased, but the draft reduced by suitable adjustment of the speed of the draft fan until the scales 43 and 65 are in alinement. When this is effected, the firing rate will tend to increase with more effective combustion, the steam pressure will usually tend to rise, and both the rate of fuel supply and the draft must be reduced a proportionate amount to provide the desired steaming rate.

The indicator, in accordance with the present invention, is particularly useful in connection with the operation of marine boilers, particularly where no automatic combustion control system is used or is feasible.

I claim:

1. In an indicating instrument for a steam boiler, a casing having a fixedly mounted visible scale, a shaft in said casing, a sector plate pivotally mounted on said shaft and having a visible indicating marginal edge movable with respect to said scale, members for positioning said edge responsive to draft pressure conditions in the boiler, a flow responsive member responsive to the rate of fuel supply to said boiler and having a linearly movable portion mounted in said casing, a cam in said casing connected to and linearly movable by said portion and having a surface shaped to conform to the air required for predetermined rates of fuel feed to said boiler, a follower member in engagement with said cam, a second sector plate pivotally mounted on said shaft and having an indicating marginal edge movable with respect to said scale, and an operating connection between said follower member and said second sector plate.

2. In an indicating instrument for a steam boiler, a casing having a fixedly mounted visible scale, a shaft in said casing, an indicator member on said shaft and having a visible portion movable with respect to said scale, members for positioning said indicator responsive to draft pressure conditions, a rotatable member in said casing movable in response to the quantity of fuel supplied to the boiler, a speed responsive member in said casing for converting the movement of said rotatable member to linear movement, a linearly movable cam connected to said speed responsive member and having a surface shaped to conform to the air required for predetermined rates of fuel feed to said boiler, a follower member in engagement with said cam, a second indicator member mounted on said shaft and having a visible portion movable with respect to said scale, and an operating connection between said follower member and said second indicator member.

ANGUS B. ECHOLS, Jr.

REFERENCES CITED

The following references are of record in the file of this patent:

UNITED STATES PATENTS

| Number | Name | Date |
|---|---|---|
| 923,992 | McGurrin | June 8, 1909 |
| 1,257,965 | Bailey | Mar. 5, 1918 |
| 1,401,315 | Clark | Dec. 27, 1921 |
| 1,601,057 | Bates | Sept. 28, 1926 |
| 2,130,463 | Hoyt | Sept. 20, 1938 |
| 2,143,820 | Payn | Jan. 10, 1939 |
| 2,268,549 | Kennedy | Jan. 6, 1942 |